UNITED STATES PATENT OFFICE.

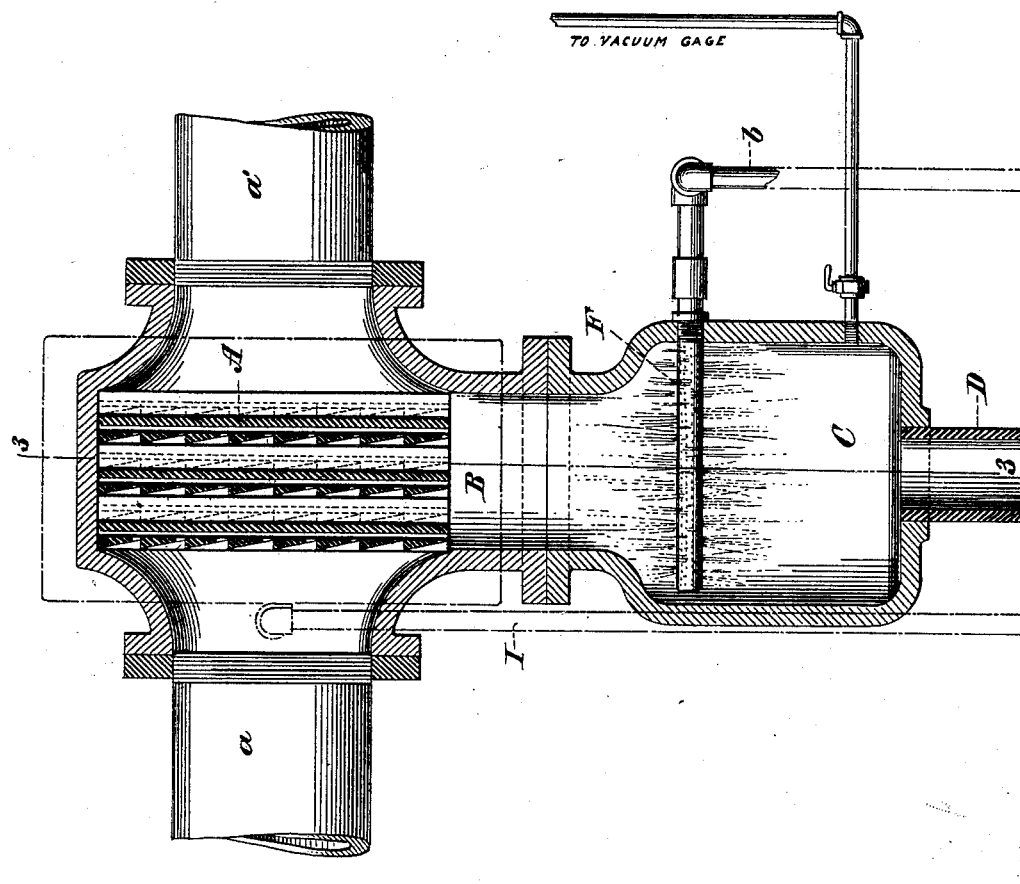

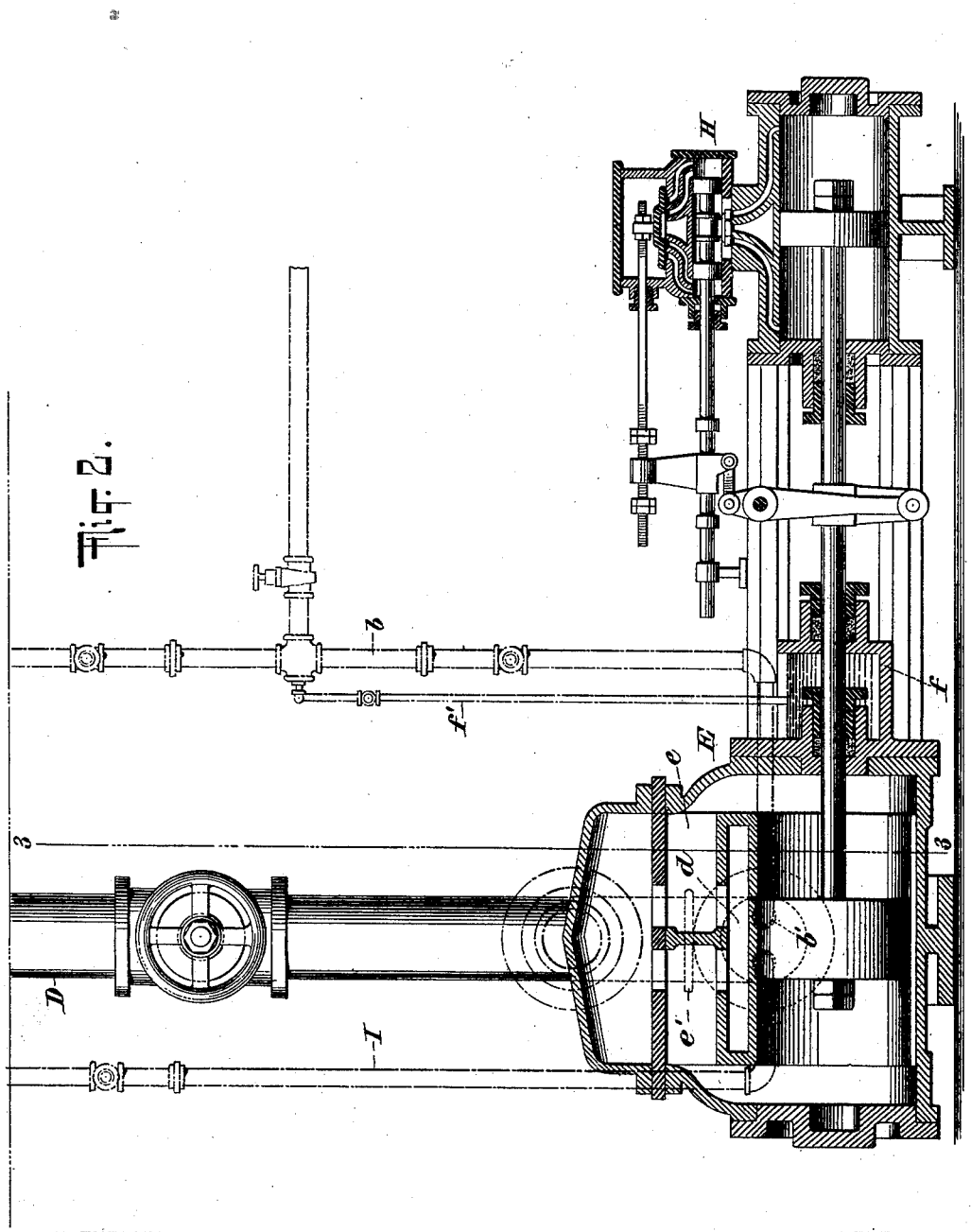

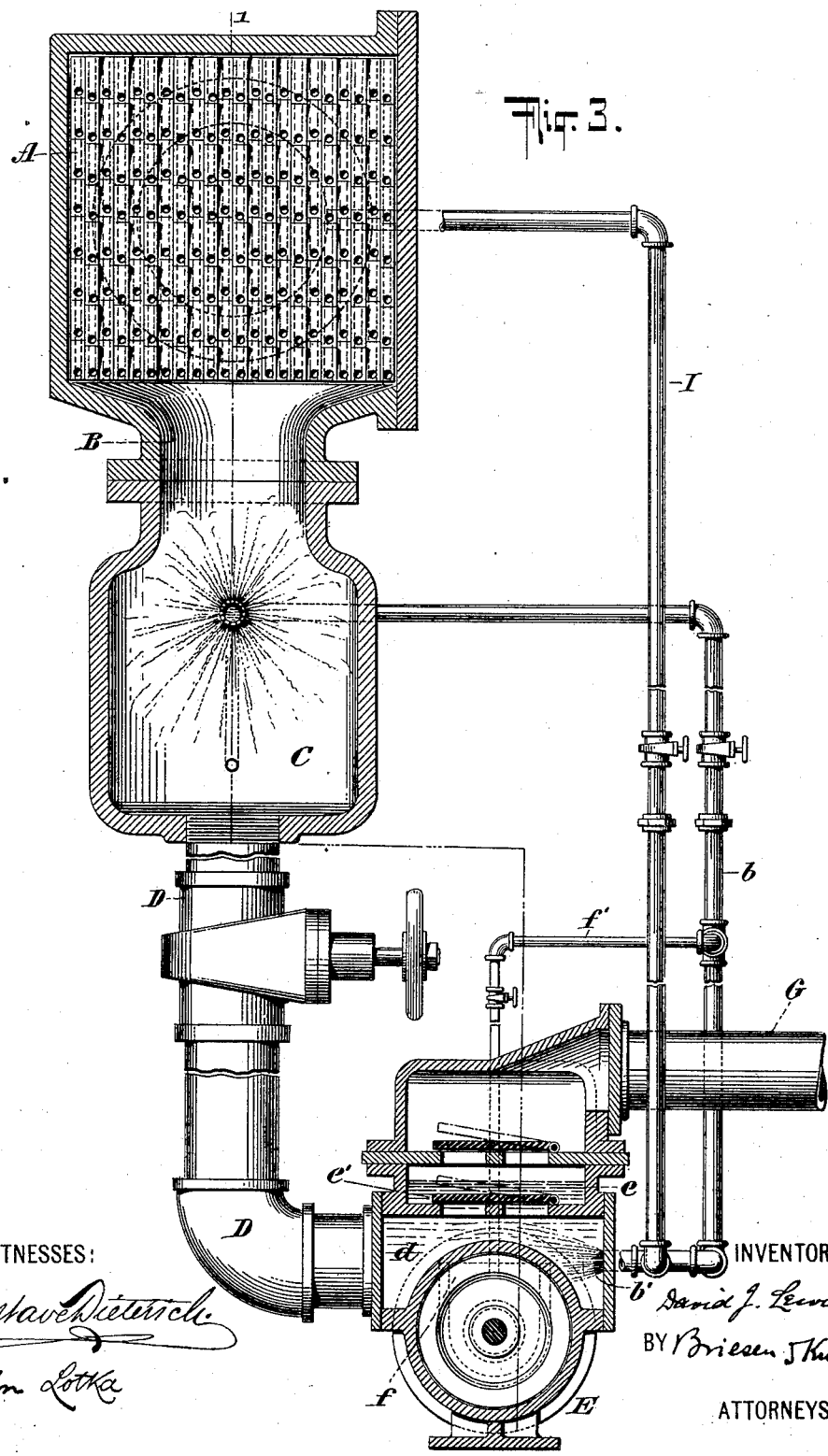

DAVID J. LEWIS, JR., OF SOUTH ORANGE, NEW JERSEY.

OIL-SEPARATING DEVICE.

SPECIFICATION forming part of Letters Patent No. 716,561, dated December 23, 1902.

Application filed October 26, 1901. Serial No. 79,888. (No model.)

*To all whom it may concern:*

Be it known that I, DAVID J. LEWIS, Jr., a citizen of the United States, and a resident of South Orange, Essex county, New Jersey, have invented certain new and useful Improvements in Oil-Separating Devices, of which the following is a specification.

My invention relates to devices for separating oil from steam, and has for its object to remove from the separator, which takes the oil out of steam passing through a condenser, all the products of condensation, all the oil, and any steam that may leave the separator together with the oil and products of condensation.

The invention will be fully described hereinafter and the features of novelty pointed out in the appended claims.

Reference is to be had to the accompanying drawings, in which—

Figure 1 is a sectional elevation of the upper part of my improved oil-separating device. Fig. 2 is a like view of the lower part of said device, and Fig. 3 is a cross-section taken in the plane at a right angle to that in which the section of Figs. 1 and 2 is taken.

A in the case is a separator of any suitable construction, the one shown in the drawings being a baffle-separator of the Bundy type. $a$ is the pipe leading to said separator, and $a'$ is the pipe leading to the condenser. From the said separator extends downward a pipe B, connected at its lower end with a receiver C, from which a pipe D leads downward to a suction-pump E. In the receiver C is arranged a spray-pipe F, which is connected with a water-supply pipe $b$. Instead of one spray-pipe I may arrange several of them in the receiver C. The object of this spray is to assist in condensing any steam that may enter the receiver and to help to create a vacuum below the separator, so as to insure the removal from the separator of any oil that may otherwise cling to it. The mixture of oil and water then passes from the receiver through the pipe D to the suction-chamber $d$ of the air-pump or suction-pump E. Into this suction-chamber $d$ is discharged another spray of water from the nozzle $b'$, connected with the pipe $b$. The object of this spray is to insure the final condensation of any steam that may have accompanied the mixture of oil and water. Another object of this spray is to cause the products of condensation and the water to fill the suction-chamber $d$ and partially the valve-chamber $e$, so as to seal the inlet-valves $e'$, since otherwise steam might pass through the valve-seat. The mixture of oil and water is fully discharged through the pipe G. At H, I have indicated the engine which drives the pump, and as said engine is of any suitable construction and forms no part of my present invention I deem it unnecessary to describe it here in detail. The suction-pump or oil-pump E likewise may be of any suitable construction. I find it advisable, however, to employ a water seal at the point where the pump-rod leaves the pump-cylinder. The water-chamber $f$ may be supplied with water by a branch pipe $f'$, connected with the main pipe $b$.

A further feature of my invention consists in an equalizing-pipe I, which connects the inlet-pipe $a$ of the separator A on the inlet side thereof with the suction-chamber $d$ of the air-pump. This equalizing-pipe acts as a regulator to produce a constant vacuum in the suction-chamber of the air-pump. As the steam rushes through the inlet-pipe $a$ toward the separator A said steam acts on the contents of the equalizing-pipe I, drawing such contents along with it, unless the vacuum in the suction-chamber $d$ is of greater effect, in which case the contents of the equalizing-pipe will be drawn toward the pump. The result of this is that the steam passing through the inlet-pipe $a$ will assist the pump in case for any reason the action of the pump should not be equal to the suction created by the steam at the upper end of the equalizing-pipe. I desire it to be observed particularly that this equalizing-pipe is connected with the inlet side of the separator, where the full speed and pressure of the steam may be availed of.

I claim as my invention—

1. The combination with a separator having an inlet, an outlet, and a third port between them, of a receiver connected with said port, a suction-pump arranged to draw steam and other matter from the separator through the receiver, and a spraying device located within the receiver.

2. The combination with a separator having an inlet, an outlet, and a third port between them, of a receiver connected with said port, a suction device for drawing steam and other matter from the separator through the receiver, and a spraying device located within the receiver.

3. The combination with a separator having an inlet, an outlet, and a third port between them, of a pump the suction-chamber of which is connected with said third port of the separator, and a spraying device arranged to discharge into said suction-chamber.

4. The combination of a separator, a receiver connected therewith, a pump the suction-chamber of which is connected to the end of the receiver opposite to that which is connected to the separator, a spraying device within the receiver, and another spraying device arranged to discharge a liquid into the suction-chamber of the pump.

5. The combination of a separator, a pump the suction-chamber of which is connected with said separator, said pump being provided with valves adjacent to said suction-chamber, and a spraying device for discharging a liquid into the suction-chamber of the pump, to insure condensation in said chamber and to create a seal on said valve.

6. The combination of a separator having an inlet, a suction device connected with the separator at a point intermediate between its inlet and its outlet, and an equalizing-pipe leading from the inlet side of the separator to the suction side of said suction device.

7. The combination of the separator having an inlet and an outlet, a pump the suction-chamber of which is connected with the separator at a point intermediate between its inlet and its outlet, an equalizing-pipe leading from the inlet side of the separator to the suction-chamber of the pump.

DAVID J. LEWIS, JR.

Witnesses:
JOHN LOTKA,
EUGENE EBLE.